(12) United States Patent
Grisar et al.

(10) Patent No.: US 7,896,630 B2
(45) Date of Patent: Mar. 1, 2011

(54) ROTARY DEVICE WITH RECIPROCATING VANES AND SEALS THEREFOR

(75) Inventors: Robert Grisar, Kirtland, OH (US); Kim Luckner, Mentor, OH (US); Denis Sankovic, Euclid, OH (US)

(73) Assignee: REGI U.S., Inc., British Columbia (CA)

( * ) Notice: Subject to any disclaimer, the term of this patent is extended or adjusted under 35 U.S.C. 154(b) by 1049 days.

(21) Appl. No.: 11/705,580

(22) Filed: Feb. 13, 2007

(65) Prior Publication Data

US 2008/0136113 A1 Jun. 12, 2008

Related U.S. Application Data

(60) Provisional application No. 60/874,007, filed on Dec. 11, 2006.

(51) Int. Cl.
*F04C 18/00* (2006.01)
*F04C 2/00* (2006.01)

(52) U.S. Cl. .................. 418/219; 418/145; 418/153; 418/261; 277/562; 277/566

(58) Field of Classification Search ......... 418/145–148, 418/153, 219, 265, 261; 277/551, 553, 562, 277/566, 568, 572, 581, 589
See application file for complete search history.

(56) References Cited

U.S. PATENT DOCUMENTS

| | | | | |
|---|---|---|---|---|
| 1,527,685 A | * | 2/1925 | Huwiler ...................... 418/261 |
| 1,686,767 A | * | 10/1928 | Saxon ........................ 418/219 |
| 2,345,561 A | * | 4/1944 | Allen, Jr. .................... 418/148 |
| 2,590,729 A | * | 3/1952 | Scognamillo ............... 418/173 |
| 3,468,260 A | | 9/1969 | Belden | |
| 3,551,080 A | | 12/1970 | Feller | |
| 3,769,945 A | | 11/1973 | Kahre | |
| 3,799,710 A | | 3/1974 | Jacobs | |
| 3,865,521 A | | 2/1975 | Upchurch | |
| 3,873,253 A | | 3/1975 | Eickmann | |
| 4,004,556 A | * | 1/1977 | Pfeiffer ...................... 418/148 |
| 4,028,028 A | * | 6/1977 | Fuchs, Jr. ................... 418/219 |
| 4,325,394 A | | 4/1982 | Reams | |

(Continued)

FOREIGN PATENT DOCUMENTS

EP 0 548416 6/1993

(Continued)

*Primary Examiner*—Theresa Trieu
(74) *Attorney, Agent, or Firm*—Berenato & White, LLC

(57) ABSTRACT

A rotary device comprises a stator and a rotor. The stator has a cam surface. The rotor has a sleeve and a hub. There is a plurality of vanes reciprocatingly mounted on the rotor. There is a plurality of first longitudinal edge seals disposed on the sleeve. The first longitudinal edge seals each seal at least a portion of a first longitudinal edge of one of the vanes against the sleeve. There is a plurality of second longitudinal edge seals disposed on the hub. The second longitudinal edge seals each seal at least a portion of a second longitudinal edge of one of the vanes against the hub. There is a plurality of end edge seals. The end edge seals each seal a respective end edge of one of the vanes against the cam surface. The end edge seals each are in sealing engagement with respective ones of the first and second longitudinal edge seals.

23 Claims, 15 Drawing Sheets

U.S. PATENT DOCUMENTS

| | | |
|---|---|---|
| 4,401,070 A | 8/1983 | McCann |
| 4,474,105 A | 10/1984 | Eicher et al. |
| 4,573,892 A | 3/1986 | DuFrene |
| 4,575,324 A | 3/1986 | Sommer et al. |
| 4,667,468 A * | 5/1987 | Hansen .................. 123/248 |
| 4,799,867 A * | 1/1989 | Sakamaki et al. ........... 418/261 |
| 5,429,084 A | 7/1995 | Cherry et al. |
| 5,509,793 A | 4/1996 | Cherry et al. |
| 5,551,853 A | 9/1996 | Cherry et al. |

FOREIGN PATENT DOCUMENTS

| | | | |
|---|---|---|---|
| EP | 1167040 | 1/2006 | |
| GB | 1110162 | 4/1968 | |
| GB | 1 430 196 | 3/1976 | |
| GB | 2419382 | 4/2006 | |
| JP | 55098689 A * | 7/1980 | ................ 418/148 |
| JP | 02019601 A * | 1/1990 | ................ 418/219 |
| WO | WO 85/03736 | 8/1985 | |
| WO | WO 0133082 | 5/2001 | |
| WO | WO 2006018848 | 2/2006 | |

* cited by examiner

ROTARY DEVICE WITH RECIPROCATING VANES AND SEALS THEREFOR

RELATED APPLICATION

The present application claims the benefit of U.S. provisional patent application Ser. No. 60/874,007, filed Dec. 11, 2006, the disclosure of which is incorporated by reference.

BACKGROUND OF THE INVENTION

1. Field of the Invention

The present invention relates to a rotary device and, in particular, to sealing reciprocating vanes of a rotary device.

2. Description of the Related Art

Rotary devices have long been thought to be an efficient way of rotating a shaft in the case of an rotary engine, pumping a fluid in the case of a pump, and compressing a fluid in the case of a compressor. Rotary devices are generally characterized by a rotating "piston", or the equivalent, instead of a traditional linearly reciprocating piston as found in piston engines, pumps, and compressors. However, sealing the rotating "piston" has presented an extremely challenging problem, ultimately resulting in lack of widespread adoption of this technology. The sealing problems are particularly acute in a rotary engine as compared to a pump or a compressor. This is mainly because a combustion engine typically operates at higher pressures and temperatures, and therefore requires tighter sealing than in other applications. An inherent conflict in this technology is that tighter sealing may result in excessive friction and premature seal failure.

Many different approaches have been tried to address sealing issues with rotary devices including the elimination of seals altogether and reliance instead on close tolerances and accurate machining to seal leakage. Although in principle this approach may work for lower pressure and temperature applications, it is unsuitable for the higher temperatures and pressures of rotary engines where friction and thermal expansion are present. Ultimately the rotating "piston" will get hotter than the external casing. A "piston" that is a snug fit when the rotary engine has just been started will become tighter and tighter as it heats. A further complication is that unequal heating of the various parts will lead to non-uniform expansion of the parts, resulting in changes in shape as well as in size that make sealing attempts through tolerances and accurate machining unsuccessful in rotary engines.

Rotary engines have long been thought to be a viable replacement for the standard reciprocating piston engines. Rotary engines offer possible increases in mechanical and fuel efficiency, as well as more compact dimensions and a lower weight. The major deficiencies in traditional reciprocating piston engines arise from the short stroke of the pistons which leads to incomplete combustion. In theory, rotary engines provide a more continuous power stroke with decreased structural complexity, due mostly to the reduction in the number of moving parts. In practice, however, rotary engines have not received widespread acceptance and have only had limited success in replacing reciprocating piston engines, due mainly to the complexities involved in building a "simpler" rotary engine. Specifically, rotary engines typically involve a complex-shaped combustion chamber which presents problems in sealing the combustion chamber. The inability to adequately seal the combustion chamber has lead to many failed prototypes of the rotary engine.

One rotary engine that has received some commercial acceptance is the Wankel engine which is used in some models of automobiles produced by Mazda. A Wankel engine has a triangular shaped rotor, i.e., a rotating "piston" incorporating a central ring gear which is driven around a fixed pinion within an oval shaped housing. The triangular shaped rotor creates three combustion chambers between the rotor and the interior walls of the housing as the rotor turns within the housing. Each of the three rotating combustion chambers dynamically changes in volume as the triangular rotor rotates in the oblong housing and undergoes the four stages of the Otto cycle—intake, compression, ignition and exhaustion. The rotary motion is transferred to the drive shaft via an eccentric wheel that rides in a bearing in the rotor that matches the central ring gear. The drive shaft rotates once during every power stroke instead of twice as in a typical four stroke reciprocating piston engine. The Wankel engine promised higher power output with fewer moving parts than the Otto cycle reciprocating piston engine, however, technical difficulties associated with sealing the three rotating combustion chambers have apparently interfered with widespread adoption.

Another type of rotary engine is known as the axial vane rotary engine. In an axial vane rotary engine, a circular rotor is located between two cams, each cam having a cooperating undulating cam surface facing the rotor. The rotor has a series of angularly spaced apart slots to receive respective ones of axially sliding vanes whose ends reciprocatingly contact respective ones of the undulating cams surfaces so that combustion chambers are dynamically formed between adjacent axially sliding vanes. Axial vane rotary engines are described in U.S. Pat. Nos. 4,401,070, 5,429,084, 5,509,793 and 5,551,853, all of which are herein incorporated by reference.

An axial vane rotary engine has the capacity to provide greater output than a Wankel rotary engine of the same size. However, an axial vane rotary engine presents a greater sealing challenge since the vanes slide both axially with respect to the rotor and circumferentially with respect to the cam surfaces. The present invention is directed to a rotary device of improved design over the prior art which facilitates the ability to adequately seal the combustion chambers formed between adjacent vanes.

It is understood that one of skill in the art of rotary devices can apply the principles discussed herein in the various embodiments equally to other rotary devices such as pumps, compressors, expanders, etc.

BRIEF SUMMARY OF INVENTION

According to a first aspect of the present invention there is provided a rotary device comprising a stator and a rotor. The stator has a cam surface. The rotor has a sleeve and a hub. The sleeve rotatably engages a periphery of the cam surface. The hub extends to the cam surface. There is a plurality of vanes reciprocatingly mounted on the rotor. The vanes each have a first longitudinal edge which slidingly engages the sleeve, a second longitudinal edge which slidingly engages the hub, and an end edge which slidingly engages the cam surface. There is a plurality of first longitudinal edge seals disposed on the sleeve. The first longitudinal edge seals each seal at least a portion of the first longitudinal edge of one of the vanes against the sleeve, and the first longitudinal edge seals each extend to the cam surface. There is a plurality of second longitudinal edge seals disposed on the hub. The second longitudinal edge seals each seal at least a portion of the second longitudinal edge of one of the vanes against the hub, and the second longitudinal edge seals each extend to the cam surface. There is a plurality of end edge seals, the end edge seals are each disposed on a respective end edge of one of the vanes. The end edge seals each seal the respective end edge of one of the vanes against the cam surface. The end edge seals each are in sealing engagement with respective ones of the first and second longitudinal edge seals.

According to a second aspect of the invention there is provided a seal for sealing a reciprocating vane at an interface in a rotary device. The seal comprises an annular resilient body having a first side, a second side, an inside and an outside. A first sealing lip extends about the inside of the annular body on the first side thereof. A first resilient member extends about the annular body adjacent to the first sealing lip. A second sealing lip extending about the inside of the annular body on the second side thereof. A second resilient member extends about the annular body adjacent to the second sealing lip.

According to a third aspect of the invention there is provided a rotor for a rotary device. The rotor comprises a sleeve having a plurality of sealing members disposed on an inner concave surface thereof. There is a hub disposed within the sleeve. The hub has a plurality of sealing members disposed on an outer convex surface thereof. There an annular surface disposed between the sleeve and the hub. The annular surface has a plurality of slots extending therethrough.

According to a fourth aspect of the invention there is provided a vane for a rotary device. The vane comprises a rectangular body having first and second rounded longitudinal edges, first and second rounded end edges, and a sealing channel extending along each of the end edges. There is a sealing member disposed in each of the sealing channels.

The present invention provides the advantage of effective sealing chambers of a rotary device. The rotary device may be selected from a group of rotary devices including an engine, a pump, a compressor, and an expander.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

The present invention is directed to a rotary device capable of various implementations such as an engine, a pump, a compressor, or an expander, each having the following general features: (a) first and second chamber paths allowing for a plurality of chambers to be formed between adjacent vanes; (b) first and second undulating cam surfaces, each cam surface forming part of a chamber, and the vanes being driven off the cam surfaces; and (c) the volume of each of the chambers dynamically changing as the chambers are rotated radially with respect to the cam surfaces. The ability to rapidly change the volume of the chambers, and eliminate leakage between the chambers and other cavities, is crucial to the successful implementation of the device.

Figure 1:
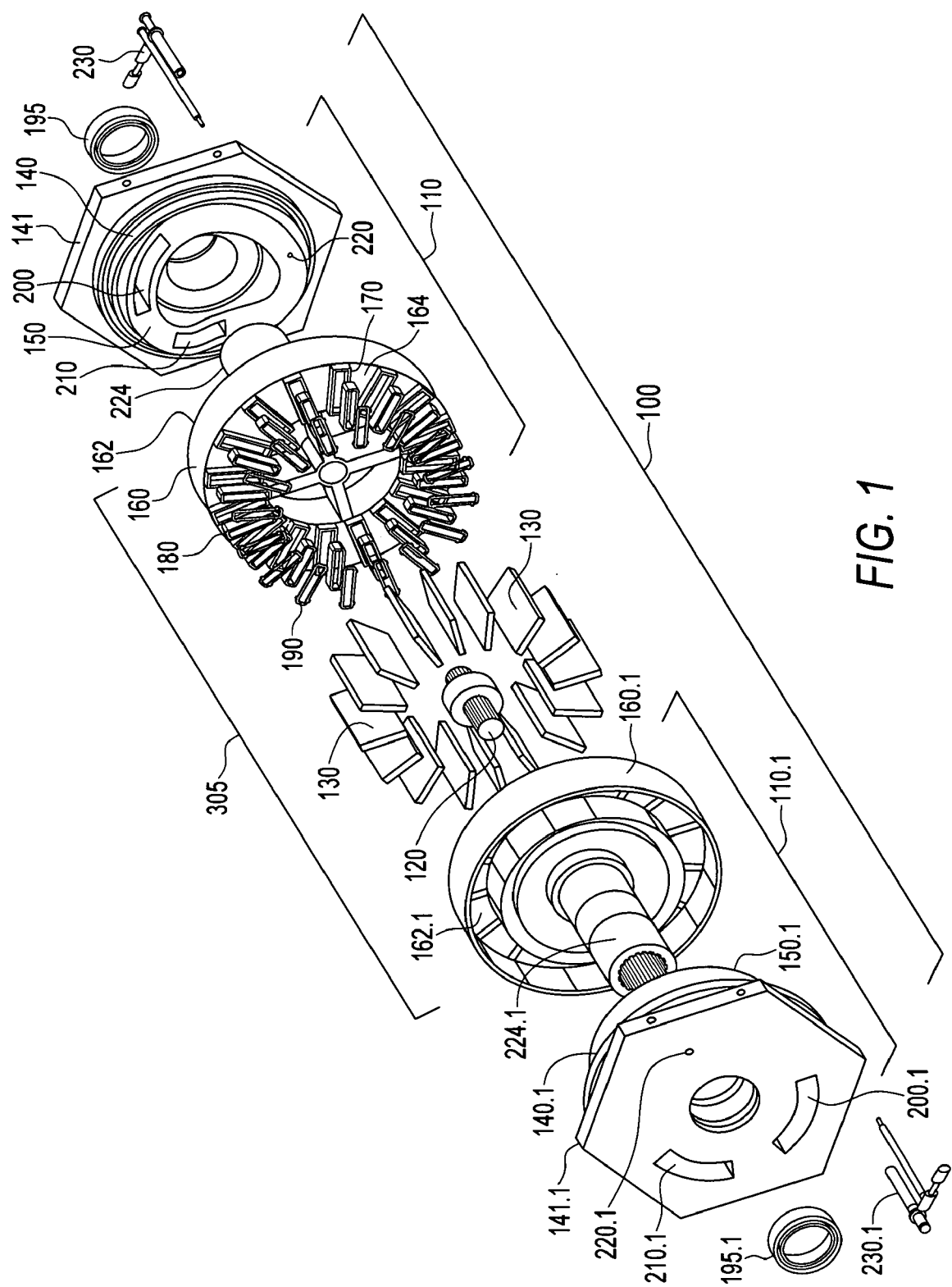
FIG. 1 is a simplified exploded, isometric view showing a rotary device according to an embodiment of the invention.

Referring to the figures and first to FIG. 1, there is shown a rotary device 100, according to a preferred embodiment of the invention. In this example the rotary device 100 is a rotary engine. The rotary device 100 has a first power set 110 and a second power set 110.1. The first power set 100 is connected to the second power set 110.1 by a stub shaft 120. The first power set 110 and second power set 110.1 share a common set of vanes 130. The first power set 100 and the second power set 110.1 have substantially similar components. In the second power set 110.1, like components have been given like reference numerals, as in the first power set 110, with the additional numerical design "0.1". Only the first power set 110 is described herein, since power sets 110 and 110.1 are substantially similar, with the understanding that the second power set 110.1 operates in a substantially similar manner.

The first power set 110 includes a stator 141 and a rotor member 160. The stator 141 has a cam 140 disposed thereon. The cam 140 has an undulating cam surface 150 which has a substantially sinusoidal profile in this example. The rotor member 160 is in rotating engagement with periphery of the cam 140. The rotor member 160 has an interior annular surface 162, best shown in FIG. 2, and an exterior surface 164, as shown in FIG. 1. The interior annular surface 162 of rotor member 160 faces the undulating cam surface 150 of the stator. The exterior surface 164 of the rotor member faces the second power set 110.1 of the rotary device 100. There is a combustion chamber path between the interior face 162 of the rotor member 160 and the undulating cam surface 150 of the stator 141. It will be understood that the terms "interior" and "exterior" are used herein in relation to the first power set 110 as shown in FIG. 1.

The rotor member 160 has a plurality of angularly spaced-apart slots 170 extending therethrough. Each of the vanes 130 extends through a respective one of the spaced-apart slots 170. Each of the vanes 130 is in sliding engagement with the cam surface 150 as the rotor member 160 rotates. Each of the slots 170 is generally oblong and has a seal 180 disposed around the periphery thereof. Each seal 180 is held in place by a seal keeper 190 affixed to the exterior face 164 of the rotor 160. Each seal 180 is also generally oblong and serves to seal oil contained in an oil sump 166, shown in FIG. 3, formed between adjoining rotor members 160 and 160.1, as discussed in more detail below.

In the combustion engine configuration, as shown in FIG. 1, adjacent the interior surface 162 of the rotor member 160, each of the vanes 130 is exposed to the temperatures and pressures of the combustion process. Adjacent the exterior surface 164 of the rotor member 160, each of the vanes 130 is exposed to the positive pressure of the oil sump 166 which provides lubrication and cooling to the rotary device. The seal 180 therefore serves to seal the reciprocating vanes 130 at an interface between the oil sump 166 and the combustion process. In the combustion engine configuration, as shown in FIG. 1, the cam 140 also has an inlet port 200, an exhaust port 210 and an injection port 220. The injection port receives fuel injector 230.

Figure 2:
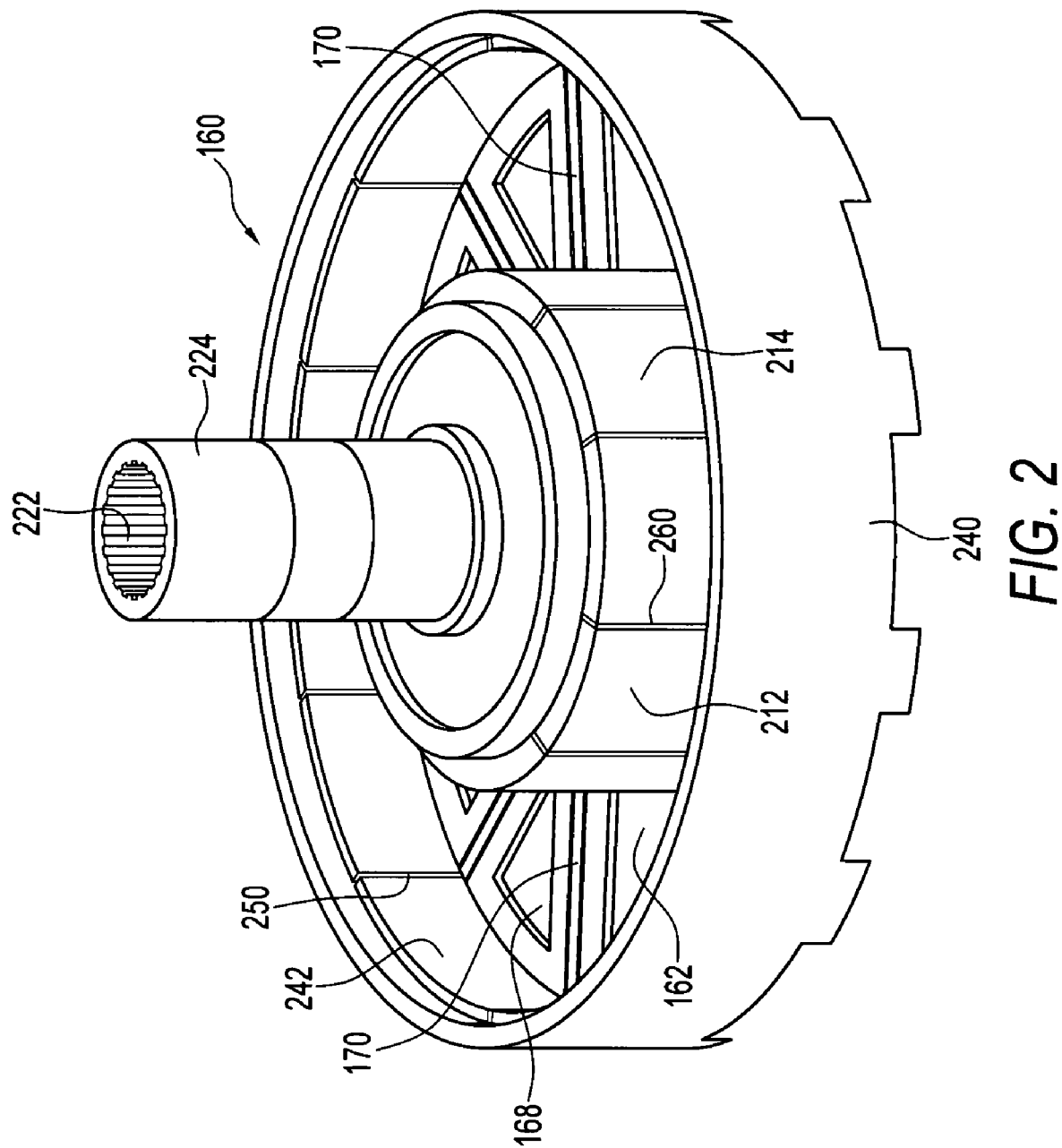
FIG. 2 is an isometric view showing a rotor member of the rotary device of FIG. 1.

Referring now to FIG. 2, the rotor member 160 includes a hub 214, a hollow hub shaft 224, and a sleeve 240. The hub shaft 224 has interior splines 222. Referring back to FIG. 1, a first end of the hub shaft passes through the stator 141 to engage rotor bearing 195. Accordingly, a second end of the hub shaft 224 engages the stub shaft 120. The stub shaft 120 connects the rotor member 160 of the first power set 110 to the rotor member 160.1 of the second power set 110.1. The stub shaft 120 holds the rotor members 160 and 160.1, of the first power set 110 and the second power set 110.1, in a fixed relationship to form a rotor 305 of the rotary device and to ensure coordinated rotation of the two rotors members 160 and 160.1.

Referring back to FIG. 2, the interior surface 162 of the rotor member 160 includes the plurality of angularly spaced apart slots 170 through each of which a respective one of the vanes 130 extends. The interior surface 162 of the rotor member 160 further has a plurality of chamber pockets 168 disposed between adjacent slots 170. The chamber pockets 168 serve to contain a compressed fuel mixture during the combustion process.

Figure 4:
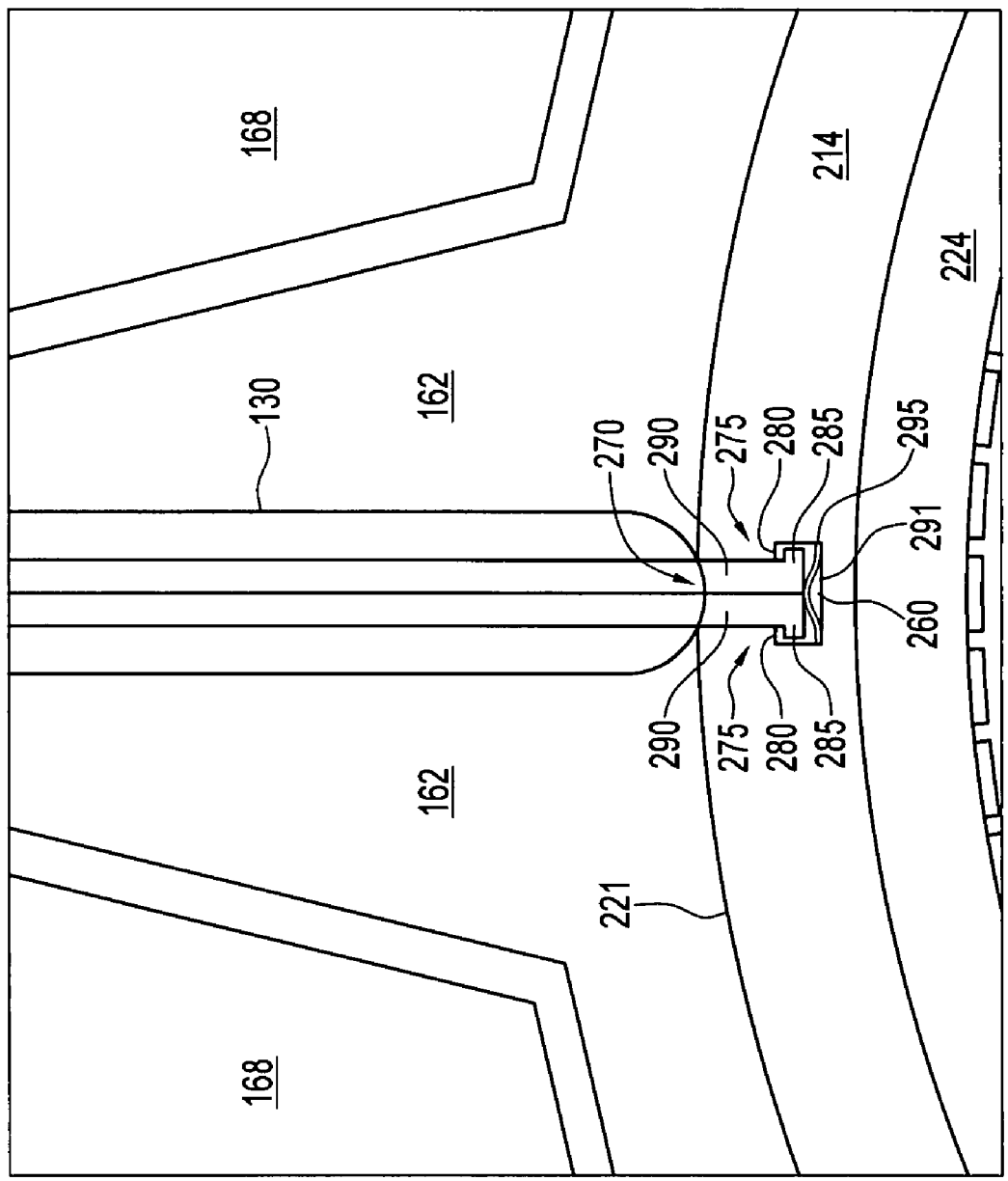
FIG. 4 is a simplified fragmentary, side view showing a sealing member sealing a longitudinal edge of a vane against an annular surface of a rotor hub of the rotor member of FIG. 2.
Figure 5:
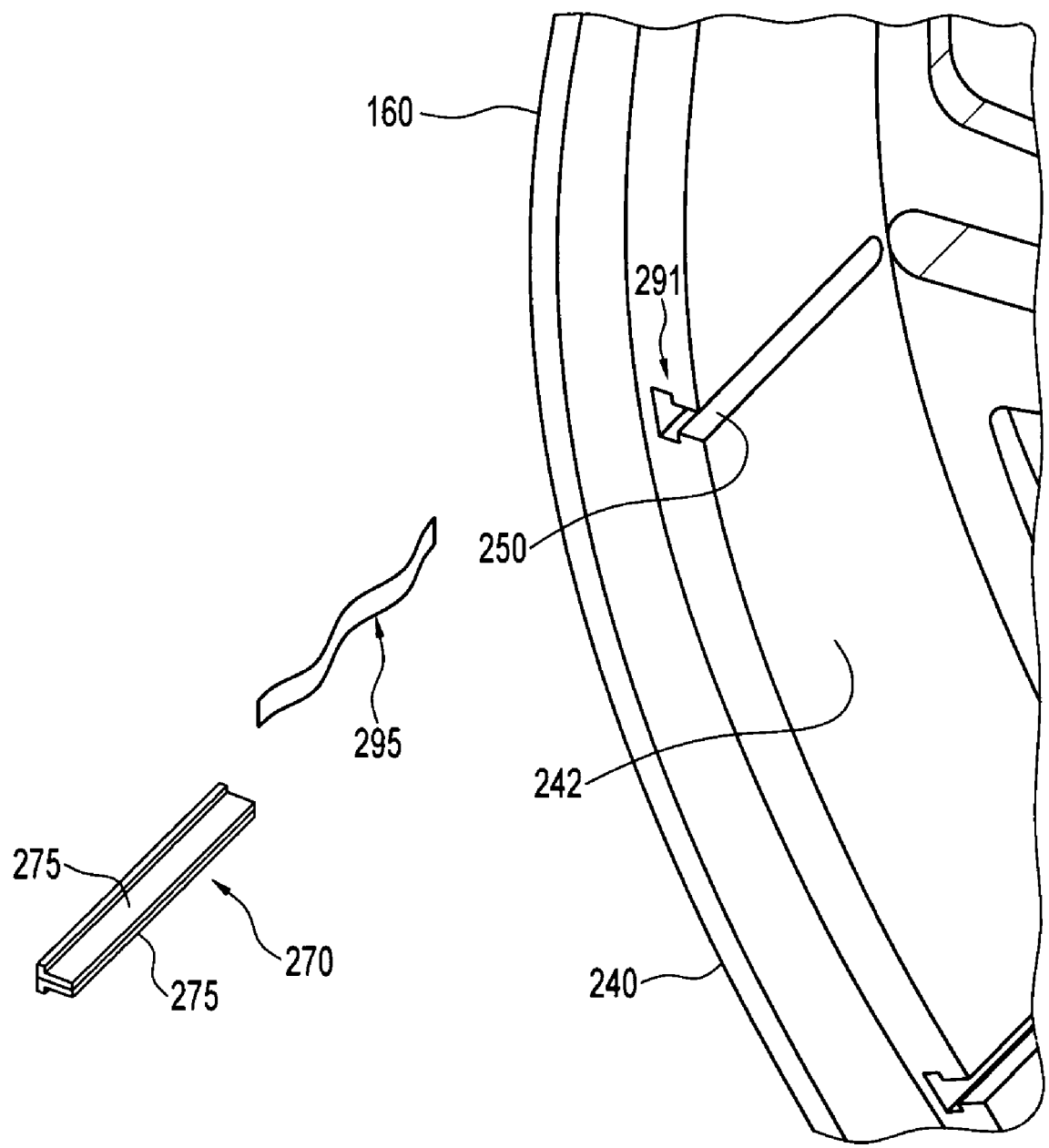
FIG. 5 is simplified fragmentary, isometric exploded view showing an interior annular surface of a rotor sleeve of the rotor member of FIG. 2 and a sealing member substantially similar to the seal member of FIG. 4.

The sleeve 240 has an inner concave surface 242 having angularly spaced-apart recessed sealing channels 250. The inner concave surface 242 of the sleeve 240 defines an outer bound of the chamber path disposed between the interior surface 162 of the rotor member 160 and the undulating cam surface 140 of the stator 141. The slotted hub 214 has an outer convex surface 212 having angularly-spaced apart recessed sealing channels 260. The outer convex surface 212 of the hub 214 defines an inner bound of the chamber path disposed between the interior surface 162 of the rotor member 160 and the undulating cam surface 140 of the stator 141. Corresponding ones of the recessed sealing channels 250 and 260 are positioned adjacent opposite ends of a respective one of the slots 170. The sealing channels 250 and 260 receive sealing members 270 in the form of longitudinal edge seals, as shown in FIG. 4 and FIG. 5. The longitudinal edge seals are used to seal at least a portion of a longitudinal edge of the vanes 130 during axial sliding motion. This will be discussed in more detail below.

The recessed sealing channels 250 and 260 are similar and therefore only the sealing channels 260 and sealing members 270 of the hub 214 are described herein with the understanding that the sealing channels 250 and sealing members 270 of the sleeve 240 are similar. As seen in FIG. 4, the sealing channels 260 have a generally T-shaped cross-section defining a pocket 291 and a pair of shoulders 280 disposed within the sealing channels 260, at a predetermined distance from the opening of the sealing channels 260 on the convex surface 221 of the hub 214.

The sealing members 270 include a pair of wiper seals 275. Each of the wiper seals 275 has a foot portion 285 and a sealing portion or sealing lip 290. The foot portions 285 extend from one end of a corresponding sealing portion 290 and are oriented substantially perpendicular to said sealing portion 290. The wiper seals 275 are positioned in the sealing channels 260 so that the sealing portion 290 of each said wiper seal is adjacent to the sealing portion 290 of said other wiper seal 275. The foot portion 285 of each said wiper seal 275 extends in substantially opposite direction to the foot portion 285 of said other wiper seal.

A resilient member 295 is disposed in the pocket 291 of each of the sealing channels 260 and urges the foot portions 285 of each of the wiper seals 275 towards respective ones of the shoulders 280, thereby biasing the sealing portions 290 of the wiper seals 275 to sealing engage at least a portion of the longitudinal edge of a respective vane 130. In this example, the resilient member is an undulating leaf spring. In another embodiment, the resilient member may be a linear expander. In a further embodiment, the resilient member may be a coil spring. The length of the sealing portion 290 extending from the channel 260 is controlled by the length of the elongated sealing portion 290 and the distance of the shoulders from the outer surface of the hub 214. The length of the elongated sealing portion 290 and the distance of the shoulders from the outer surface of the hub 214 and are selected as a function of the desired tightness of the seal.

Figure 9:
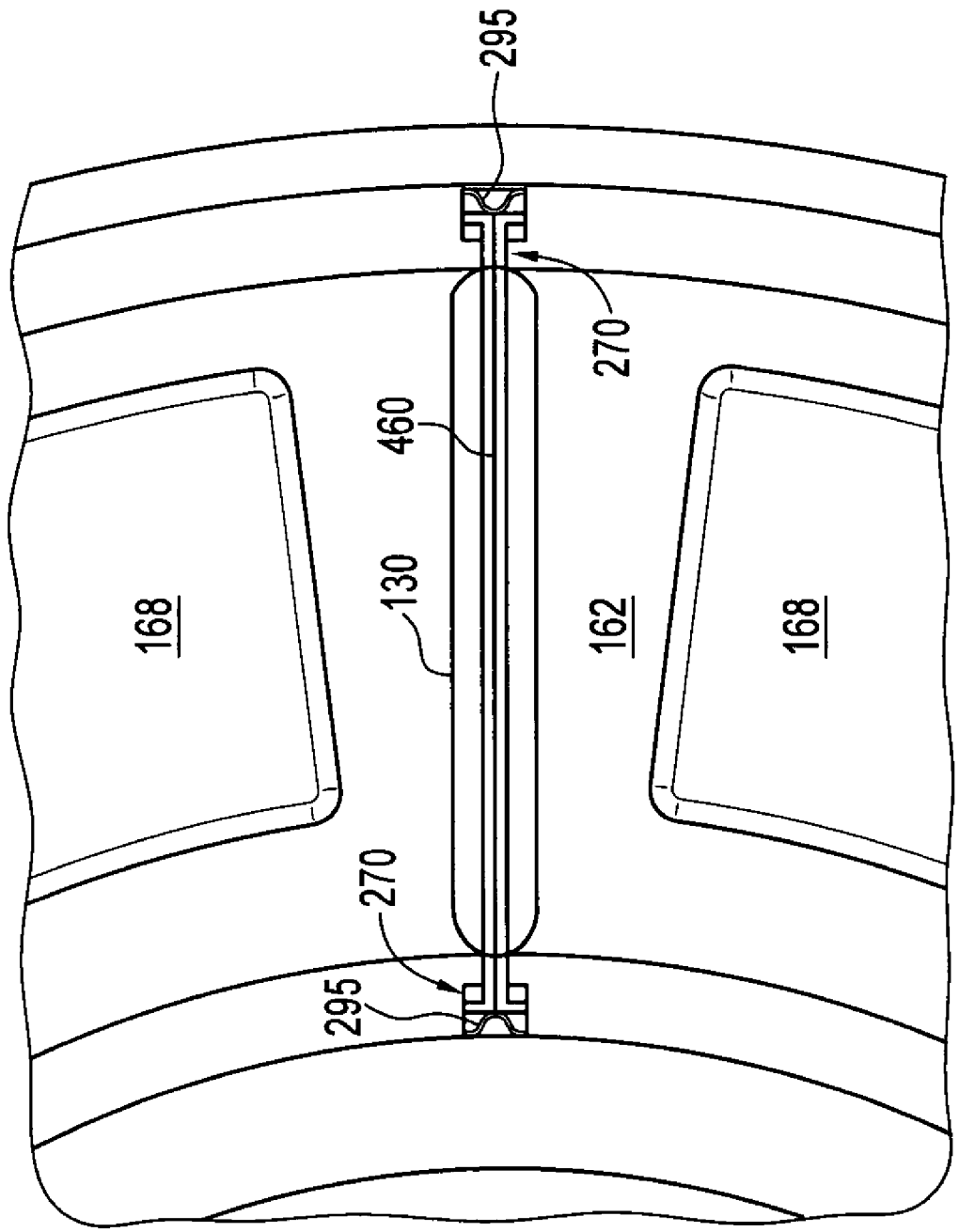
FIG. 9 is a simplified fragmentary, side view showing a sealing member sealing longitudinal edges of a vane against the rotor member of FIG. 2

While operation of the sealing members 270 at the outer convex surface 212 of the hub 214 and the sealing members 270 at the inner concave surface 242 of the sleeve 240 are similar, as best shown in FIG. 9, the spring constant of the resilient member 295 on the rotor sleeve 240 may be selected to be greater than the spring constant for the resilient member 295 on the hub 214 in order to account for the greater force imparted to the sealing member 270 at the sleeve 240 by the sliding vane 130 due to the centrifugal force from the rotation of the rotor member 160. The selection of the appropriate spring constant for the resilient member 295 ensures that the vane 130 is properly positioned with respect to the rotor member 160.

Figure 11:
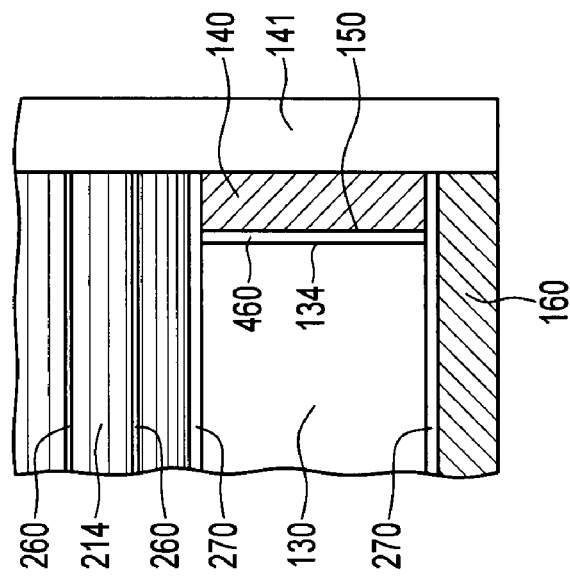
FIG. 11 is a simplified sectional view showing the sealing members of FIG. 4 and FIG. 5 in sealing engagement with end edge seal of FIG. 8.
Figure 10:
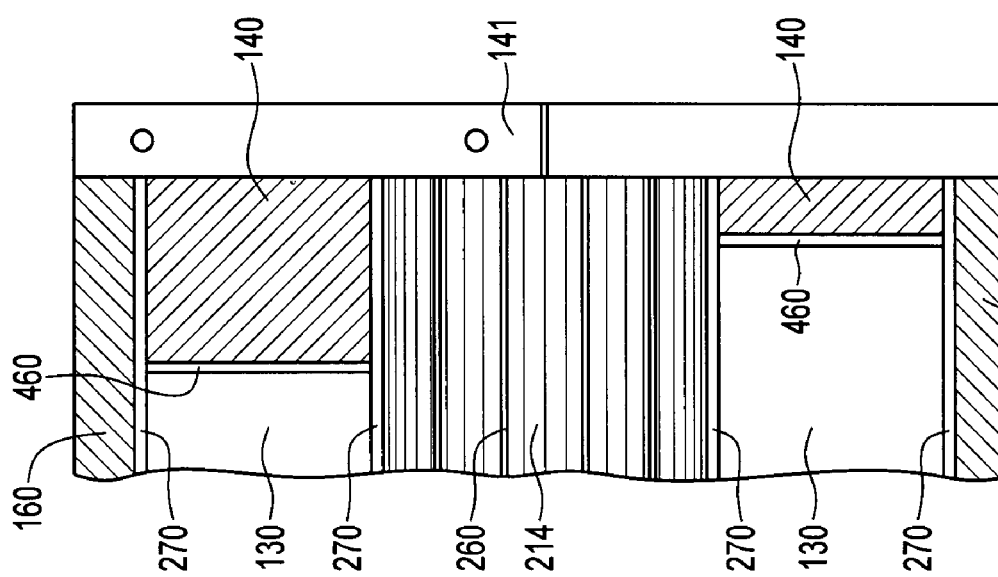
FIG. 10 is a simplified sectional view showing the sealing members of FIG. 4 and FIG. 5 extending past an undulating cam surface of the rotary device of FIG. 1.

Unlike the sealing members proposed in the prior art for sealing the vanes, which may consist of a single wiper located on the apex of the edge of the vane, the sealing members 270 of the present invention provide independent sealing action of dual wiper seals 275, thus providing a greatly improved dynamic seal. Furthermore, the sealing members 270 extend beyond the undulating cam surface 150 of the stator 141 as shown in FIGS. 10 and 11 providing improved sealing at the corners.

Figure 6:
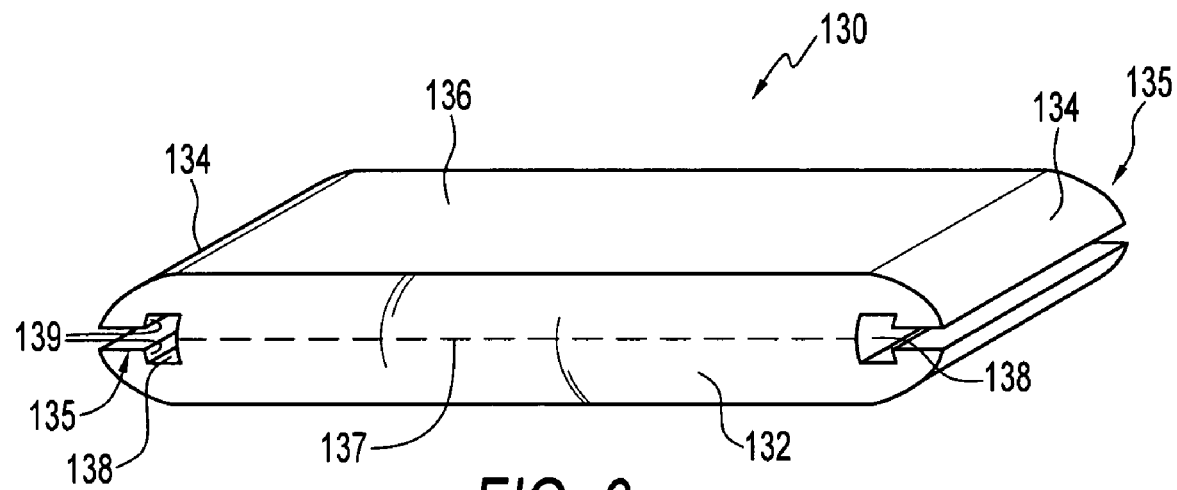
FIG. 6 is a simplified isometric view showing a vane for use with the rotary of FIG. 1.
Figure 8:
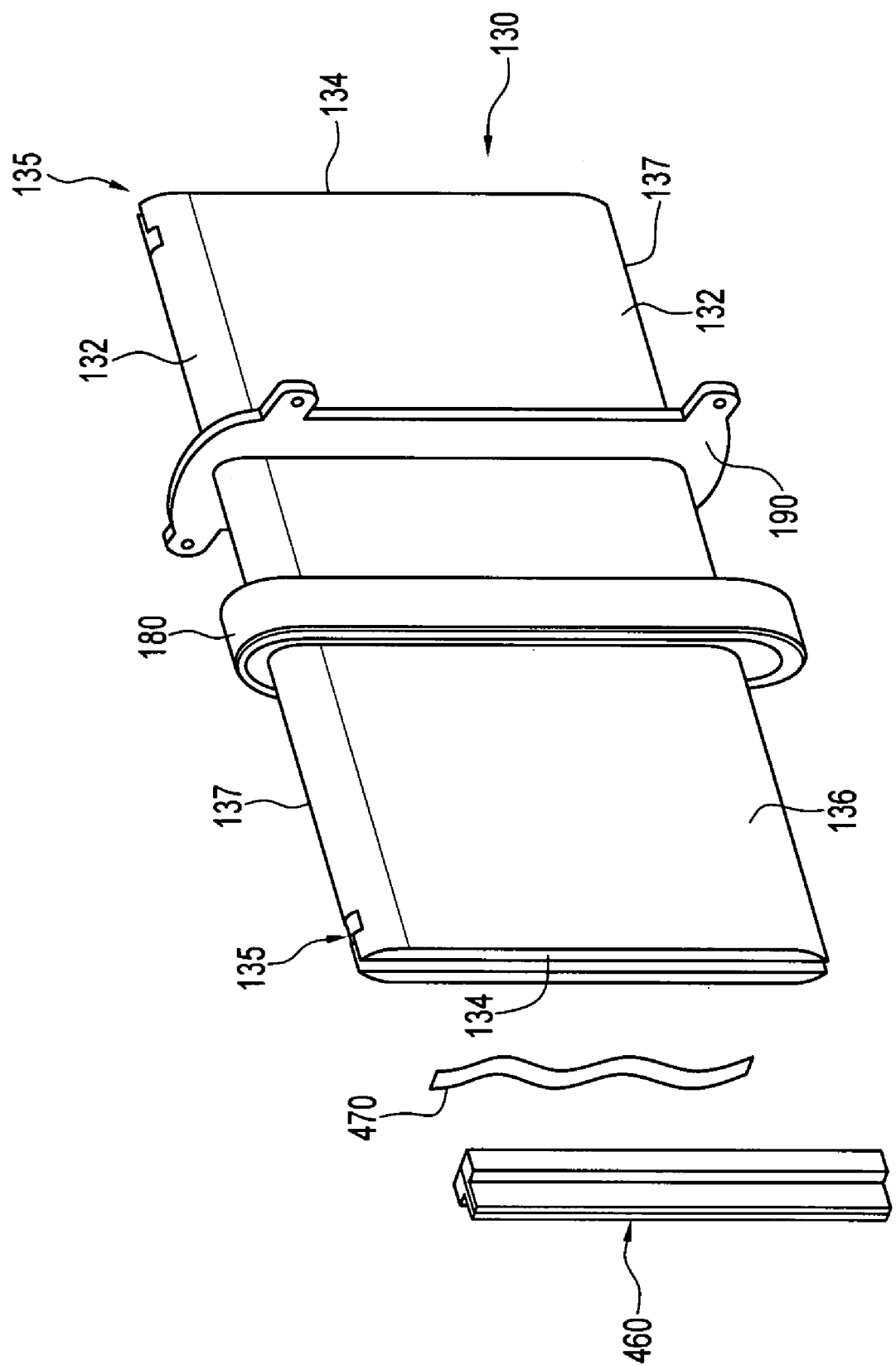
FIG. 8 is a simplified exploded, isometric view showing the vane of FIG. 6, an end edge seal and the vane-to-oil sump seal of FIG. 7.

Referring now to FIGS. 6 and 8, one of the vanes 130 of the rotary device 100 is shown. Each of the vanes 130 is generally rectangular and has pair of rounded longitudinal edges 132 and a pair of end edges 134. Each rounded longitudinal edge 132 has an apex 137. Each vane 130 also has opposed side faces 136, of which only one is shown. The side faces 136 are generally smooth and flat in this example. The longitudinal edges 132 of the vane 130 slide axially along respective ones of the sealing members 270 received in recessed sealing channels 250 and 260. The curvature of the longitudinal edges 132 facilitates this motion. At least a portion of the apex 137 of each longitudinal edge is received between the dual wiper seals of respective sealing members 270.

The end edges 134 of the vane 130 slidingly engage respective cam surfaces 150 and 150.1 and are generally rounded in this example. Each of the end edges 134 has a recessed sealing channel 135 running inwardly from an apex thereof. In this example, the sealing channel 135 has a generally T-shaped cross section, as best shown in FIG. 6, and has a pocket 138 and a pair of shoulders 139 disposed in the sealing channel 135. A sealing member 460, in the form of an end edge seal, includes a pair of wipe seals and a resilient member 470 disposed in the sealing channel 135, as described above with respect to sealing members 270 in sealing channel 260.

Prior art vanes typically have sharp edges and include seals on all four edges with each seal comprising only a single wiper. The sharp edges of the prior art vanes make sealing difficult and a single wiper is not adequate for the dynamic path of rotation of the vane. Additionally, some prior art vanes have a guide pin or guide feet to drive the axial motion of the vane since the axial motion of the vane cannot be driven by the undulating cam surface due to the excessive force and friction created on the vane by the contact with the undulating cam surface. However, guide pins and guide feet contribute to a more complex sealing arrangement than is achieved by the present invention. When the cam surfaces are used to drive the axial motion of the vanes, it is necessary to ensure that excess friction is not occurring where the vanes are in contact with the cam surfaces. In the present example, if the maximum slope of the cam surface is approximately 30 degrees or less, excessive fiction is not developed between where the vane 130 contacts the cam surfaces 150.

In operation, the cam surfaces 150 and 150.1 drive the vanes 130 to slide axially as the rotor members 160 and 160.1 rotate in synchronization. The sealing members 460 on the end edges 134 of each of the vanes 130 are therefore in sealing engagement with respective ones of the undulated cam surfaces 150 and 150.1. Since the sealing members 270 extend beyond the undulating cam surfaces 150 and 150.1, when the sealing members 460 are in sealing engagement with the undulating cam surfaces 150 and 150.1 they are also in sealing engagement with the sealing members 270. In other words, and as best shown in FIGS. 10 and 11, when a sealing member 460, or end edge seal, seals an end edge of a vane against an undulating cam surface, the end edge seal is also in sealing engagement with corresponding sealing members 270, or longitudinal edge seals. This improvement over the prior art ensures improved sealing at the corners of the vanes.

The curved longitudinal edges 132 and end edges 134 of the vane 130 provide an oval shaped cross section which facilitates the sealing of the vane 130 by the vane-to-oil sump seal 180, shown in FIG. 8, as each vane passes through the slots 170 in rotor member 160. The vane-to-oil sump seal 180 is positioned around the periphery of each of the slots 170 and is held in place by the seal keeper 190.

Figure 3:
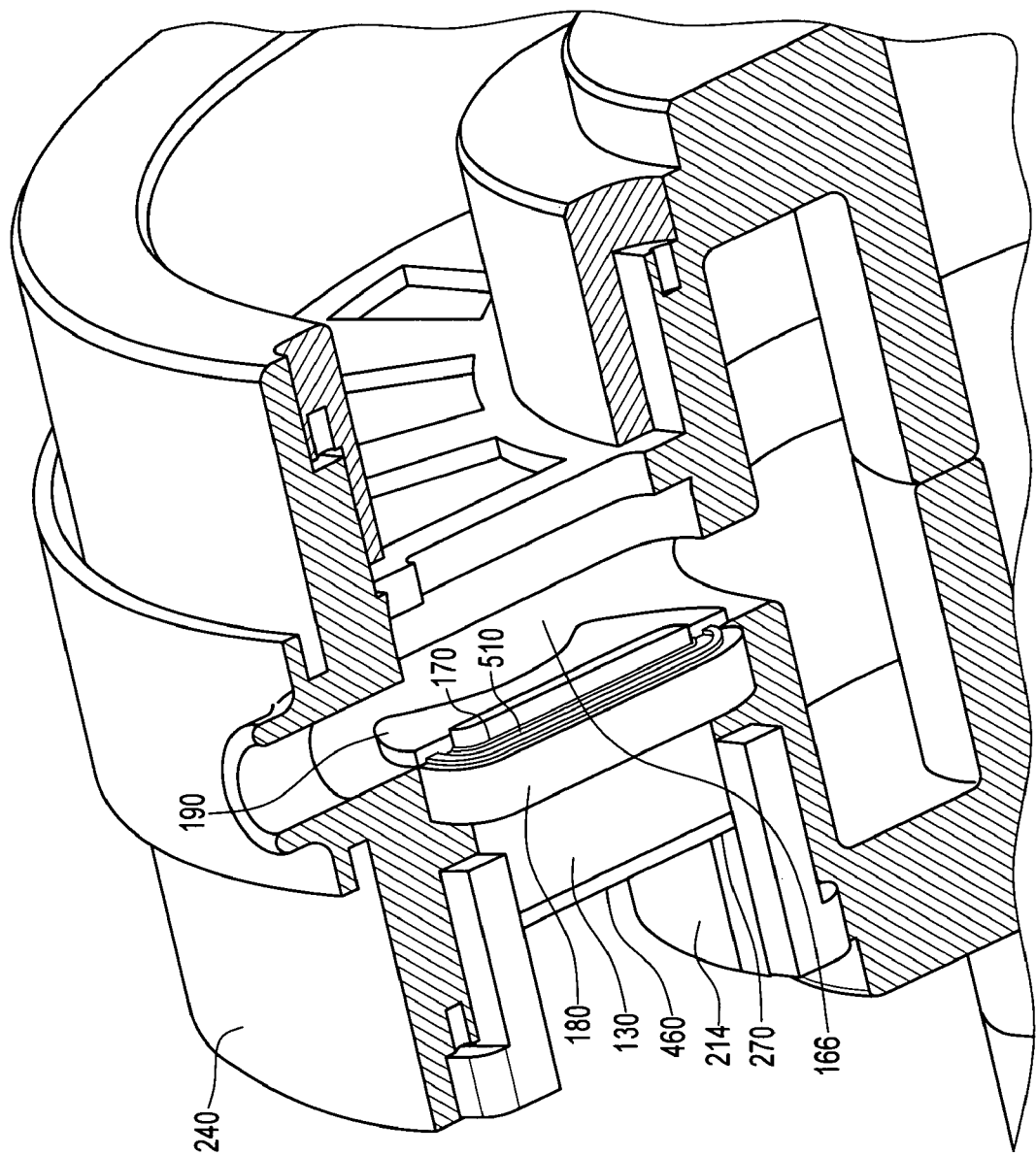
FIG. 3 is an isometric, partially broken view showing a rotor of the rotary device of FIG. 1.
Figure 7:
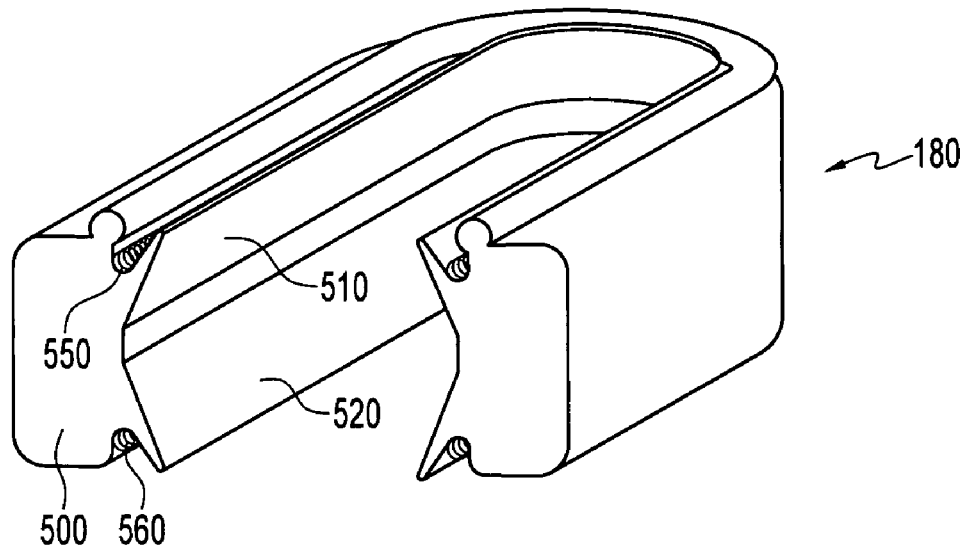
FIG. 7 is a simplified isometric, partly broken, view showing a vane-to-oil sump seal of the rotary device of FIG. 1.

Referring now to FIG. 7, the vane-to-oil sump seal 180 is shown in greater detail. The vane-to-oil sump seal 180 is made of an elastomeric material. A first sealing lip 510 extends about the inside of an annular body 500, on a first side thereof, towards the oil sump 166, as shown in FIG. 3. The first sealing lip 510 provides sealing between the vane 130 and the oil sump 166. A second sealing lip 520 extends about the inside of the annular body 500, on a second side thereof, towards the combustion chamber, as shown in FIG. 3. The second sealing lip 520 and provides sealing between the vane 130 and the combustion chamber. Resilient members in the form of springs 550 and 560 extend about the vane-to-oil sump seal 180 and are positioned in recesses between each sealing lip 510 and 520 respectively, and the annular body 500. The springs 550 and 560 bias the respective sealing lips 510 and 520 toward the surface of the reciprocating vane 130. The springs 550 and 560 are chosen with a spring constant to maintain sufficient frictional contact between the sealing lips 510 and 520 and the vane 130 to prevent leakage between the oil sump 166 and the combustion chamber.

Figure 12:
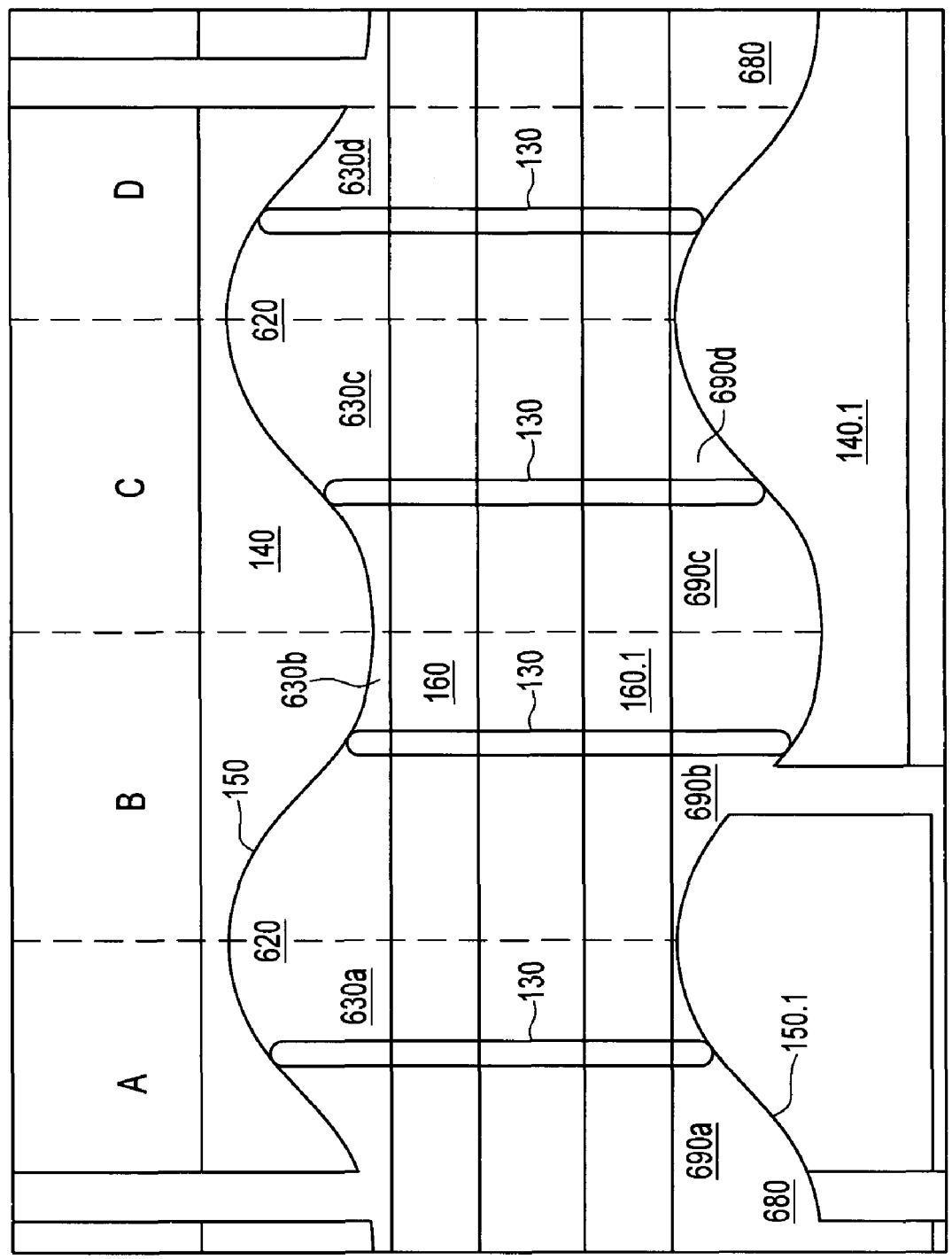
FIG. 12 is a simplified, unwrapped, plan view showing a chamber path for a rotary device with four vanes.

Referring now to FIG. 12, the interaction of the vanes 130 with the undulating cam surfaces 150 and 150.1, and the rotor members 160 and 160.1, during operation of a rotary device having four vanes is shown. The undulating cam surface 150 and the rotor 160, of the first power set 100, form a first chamber path 620 which is divided by the vanes 130 in this example into a series of chambers 630$a$, 630$b$, 630$c$ and 630$d$. The chambers 630$a$, 630$b$, 630$c$ and 630$d$ are formed between adjacent vanes 130 and thus the number of chambers is determined by the number of vanes. The cam 140.1 and the rotor 160.1, of the second power set 110.1, form a second chamber path 680 which is divided up into a plurality of chambers 690$a$, 690$b$, 690$c$ and 690$d$ by the vanes 130 which extend through both rotor members 160 and 160.1. As the vanes 130 rotate with the rotor members 160 and 160.1, the cam surfaces 150 and 150.1 drive the vanes 130 to slide axially within the chamber paths 620 and 680. Thus, unlike rotary devices of the prior art which employ guide feet or pins to guide the vanes axially, the present invention uses the cam surfaces 150 and 150.1 to impart a reciprocating motion to the vanes 130.

The chamber paths 620 and 680 are generally equivalent to each other and are 180° out of phase with each other. In the case of a diesel engine rotary axial device, the first chamber path 620 provides the four stages of the OTTO cycle as follows: Region A—intake, Region B—compression, Region C—expansion and Region D—exhaust. The same four stages are present for the second chamber path 680, but are 180° out of phase which tends to balance the combustion forces and provide a smoother rotational force. This example has combustion on both sides of the rotary device.

Figure 13:
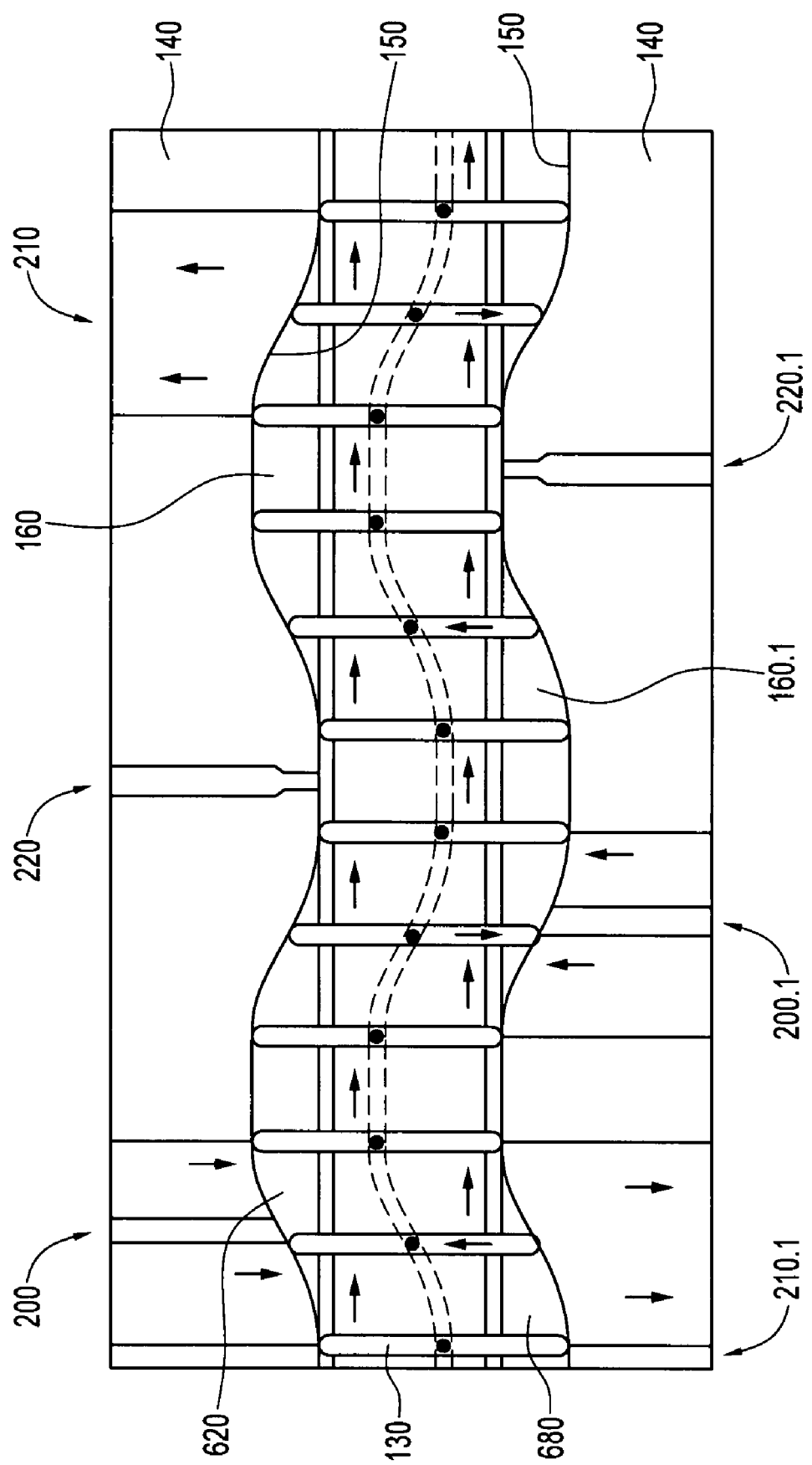
FIG. 13 is a view similar to FIG. 9 showing a chamber path for the rotary device of FIG. 1 with twelve vanes.

Referring now FIG. 13 the interaction of the vanes 130 with the undulating cam surfaces 150 and 150.1, and the rotor members 160 and 160.1, is shown during operation of the rotary device having twelve vanes 130. Also labelled in this figure are inlet ports 200 and 200.1, exhaust ports 210 and 210.1, and injection ports 220 and 220.1, respectively. For a rotary engine with twelve vanes there are twenty-four power strokes in each revolution of the rotors, twelve in the first chamber path 620 and twelve in the second chamber path 680.

As discussed previously, the sealing of a rotary device presents a more challenging problem than the sealing required for a reciprocating piston engine, which generally presents a circular sealing surface, i.e., piston rings and pistons, and also for the rotary piston type engines of the Wankel type. Referring back to FIG. 1, in the rotary device 100 of the present invention, the chambers are formed by the vanes 130, which move axially with respect to the rotor members 160 and 160.1. In other words the vanes 130 move parallel to the axis of rotation of stub shaft 120. The vanes also move rotatably with respect to the cams 140 and 140.1. In addition, the vanes 130 travel in a serpentine pattern rather than in a general circular direction as in the Wankel type rotary devices. Sealing must be provided while still allowing relative movement between the parts making up the chamber. The sealing system described above dynamically seals the chambers, introducing minimal friction, while allowing the chamber volume to alternate between minimum and maximum dimensions.

Figure 15:
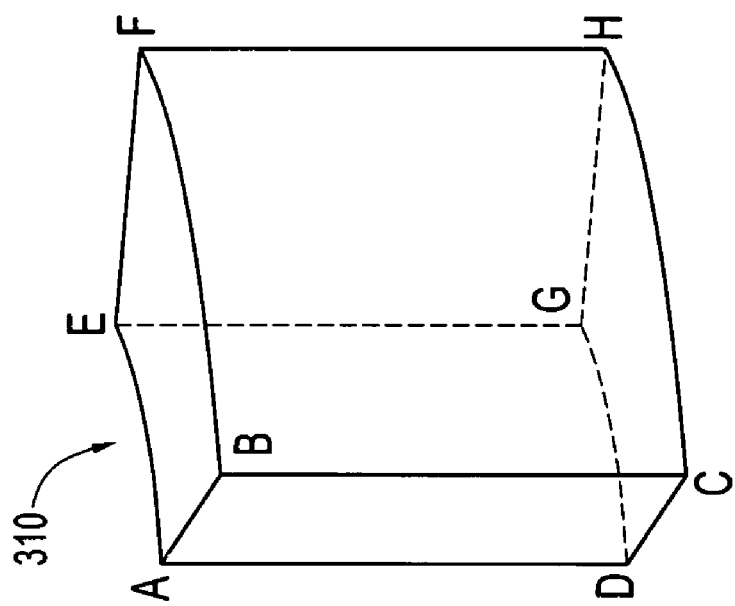
FIG. 15 is a simplified isometric view showing a single chamber for the chamber path of FIG. 13.
Figure 14:
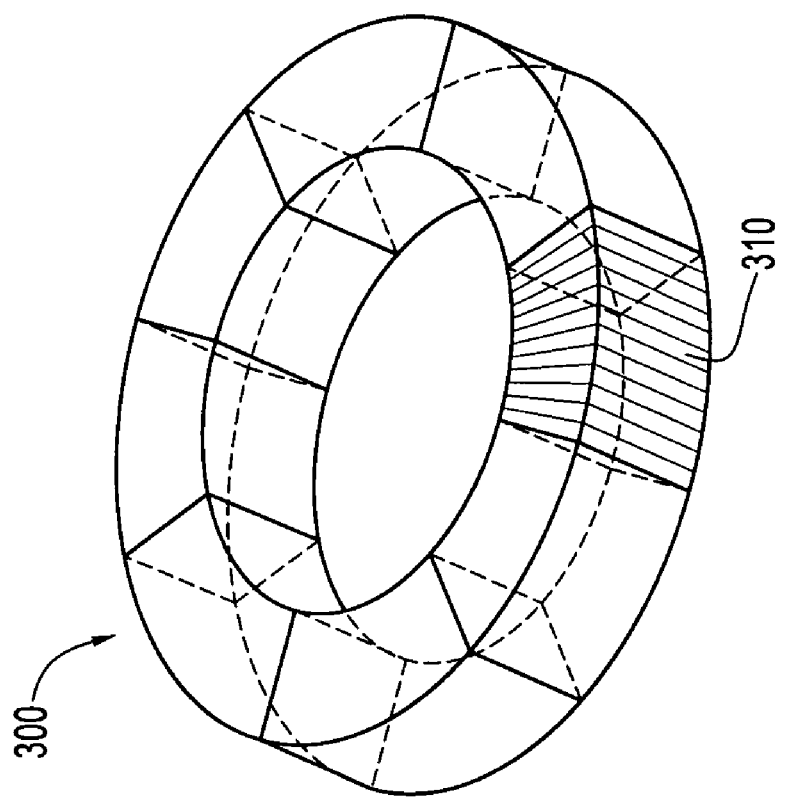
FIG. 14 is a simplified isometric view showing a chamber path of the rotary device of FIG. 1.

Referring now to FIG. 14, there is shown a simplified illustration of one of the fully expanded chamber paths as a toroid ring 300. FIG. 15 represents one of the chambers along the chamber path that depicts a fully expanded chamber 310. The fully expanded chamber 310 of FIG. 15 appears in the toroid ring of FIG. 14 as a shaded wedge segment. This segment has a shape similar to a box including six sides, eight corners, and twelve edges. The sealing requirements for each chamber are described herein with reference to FIG. 14. Surface ABCD and surface EFGH are formed by the vanes 130 extending through the chamber path. Surface ADEG is formed by the rotor hub 214. Surface BCFH is formed by the rotor sleeve 240. Surface CDGH is formed by the rotor interior face 162. Surface ABEF is formed by the undulating cam surface 150.

The six surfaces identified above present twelve edges, and a seal is required for each edge that borders a surface which moves relative to its adjacent surface. Thus, in one embodiment of the present invention, the rotor sleeve 240 is integral with the rotor 160 and thus edge CH does not require sealing. Likewise the hub 214 is integral with the rotor and thus edge DG does not require sealing. The remaining ten edges are formed by surfaces which move relative to another surface and thus require sealing.

As discussed in more detail above, edges AB and EF are sealed with sealing members 460 having a pair of wiper, edges CD and GH are sealed with the elastomeric race track seal 180, edges AD, BC, EG, and FH are sealed with sealing members 270. Edges AE and BF are sealed with labyrinth seals. In an alternative embodiment, edges AE and BF may be sealed with an o-ring or other conventional seal well known in the art.

It will be understood by a person skilled in the art that although the rotary device shown in FIGS. 1 to 11 is a rotary engine, the present invention may practiced in other embodiments including a pump, a compressor and an expander.

Figure 16:
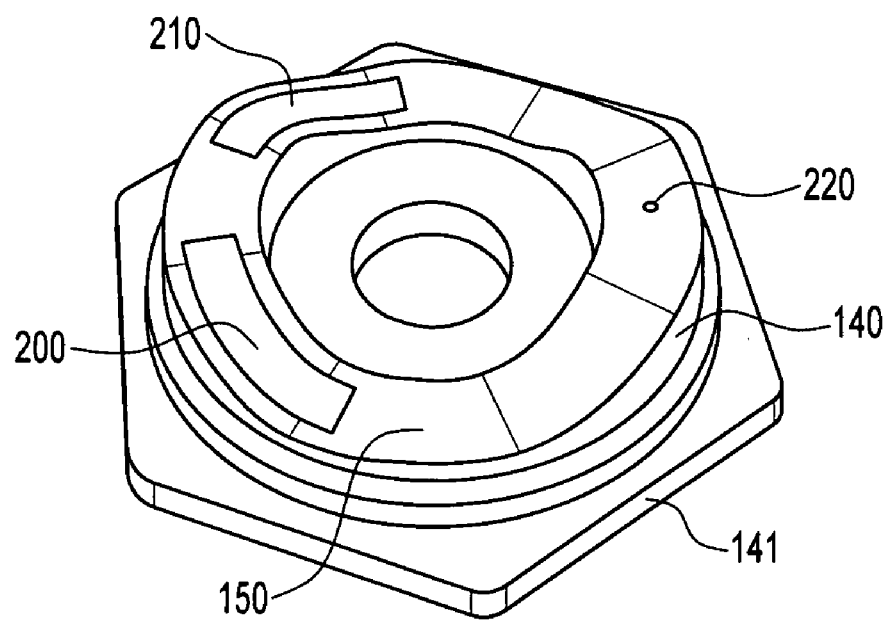
FIG. 16 is a top perspective view showing an undulating cam surface of the rotary device of FIG. 1 when the rotary device is used an engine.
Figure 20:
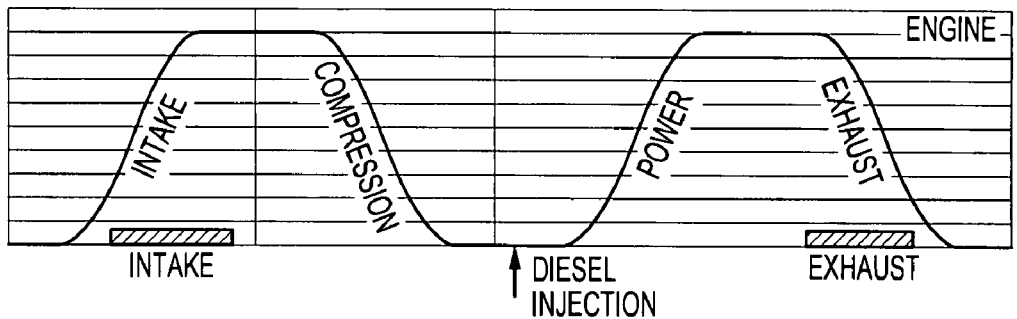
FIG. 20 is a simplified diagrammatic view showing the cycles of the rotary device of FIG. 1 when the rotary device is used as an engine.

FIG. 16 shows a stator 141 of the rotary device used when the rotary device is an engine as shown in FIGS. 1 to 11. The stator 141 has a cam 140 disposed thereon. The cam 140 has an undulating cam surface 150. The cam 140 has an inlet port 200, an outlet or exhaust port 210 and a fuel injection port 220. FIG. 20 is a simplified diagrammatic view showing the cycles of the rotary device when the rotary device is an engine.

Figure 17:
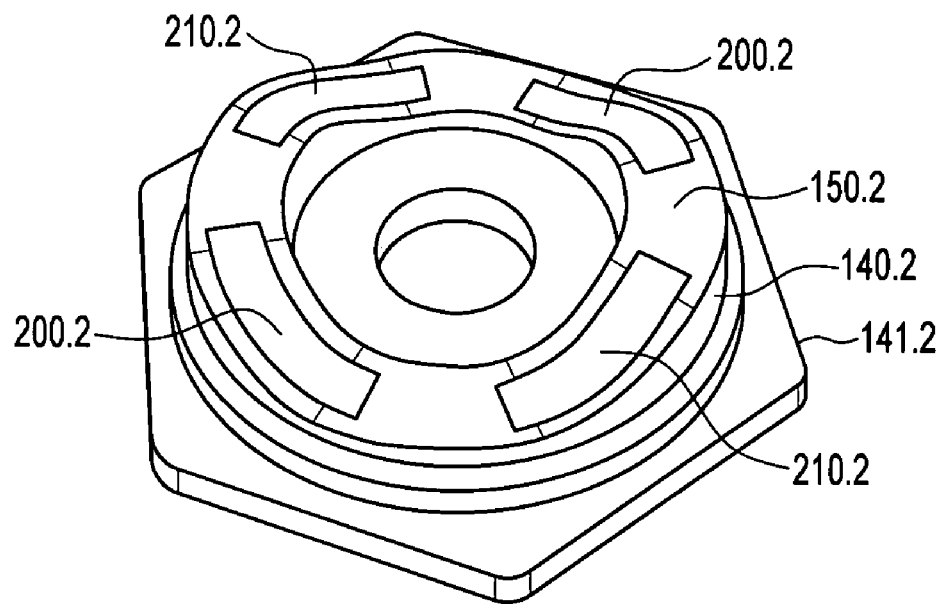
FIG. 17 is a top perspective view showing an undulating cam surface of the rotary device of FIG. 1 when the rotary device is used a pump.
Figure 21:
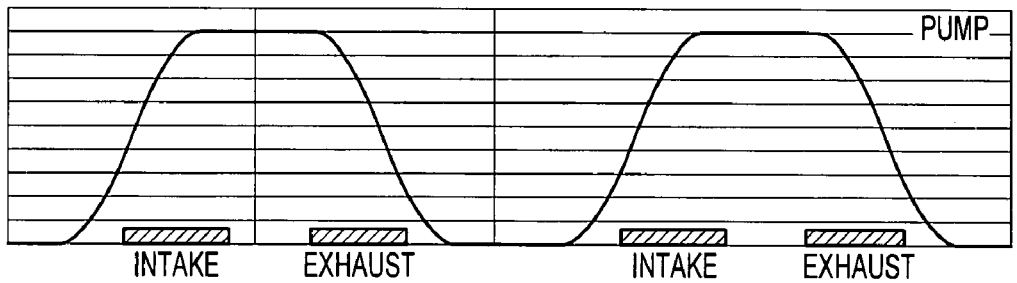
FIG. 21 is a simplified diagrammatic view showing the cycles of the rotary device of FIG. 1 when the rotary device is used as a pump.

FIG. 17 shows a stator 141.2 of the rotary device used when the rotary device is a pump. In FIG. 17 like components have been given like reference numerals, as in FIG. 16, with the additional numerical design "0.2". The stator 141.2 has a cam 140.2 disposed thereon. The cam 140.2 has an undulating cam surface 150.2. The cam 140.2 has an inlet port 200.2 and an outlet port 210.2. FIG. 21 is a simplified diagrammatic view showing the cycles of the rotary device when the rotary device is a pump.

Figure 18:
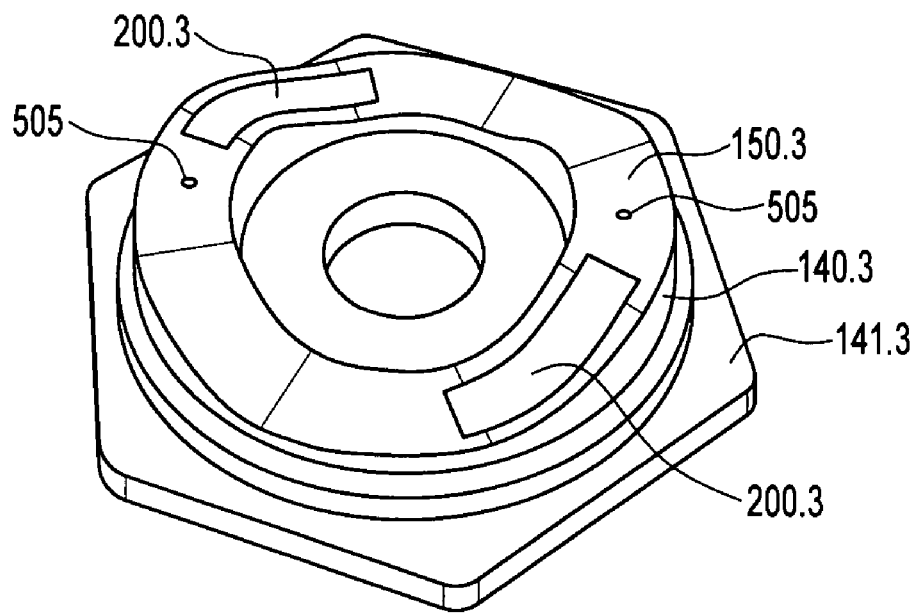
FIG. 18 is a top perspective view showing an undulating cam surface of the rotary device of FIG. 1 when the rotary device is used a compressor.
Figure 22:
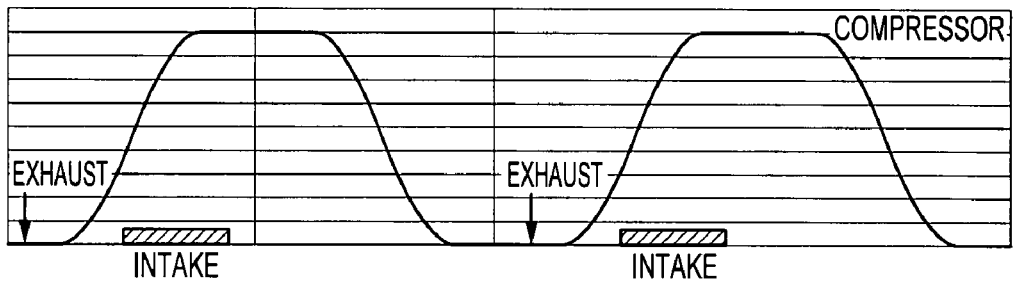
FIG. 22 is a simplified diagrammatic view showing the cycles of the rotary device of FIG. 1 when the rotary device is used as a compressor.

FIG. 18 shows a stator 141.3 of the rotary device used when the rotary device is a compressor. In FIG. 18 like components have been given like reference numerals, as in FIG. 16, with the additional numerical design "0.3". The stator 141.3 has a cam 140.3 disposed thereon. The cam 140.3 has an undulating cam surface 150.3. The cam 140.3 has an inlet port 200.3 and a high pressure outlet port 505. FIG. 22 is a simplified diagrammatic view showing the cycles of the rotary device when the rotary device is a compressor.

Figure 19:
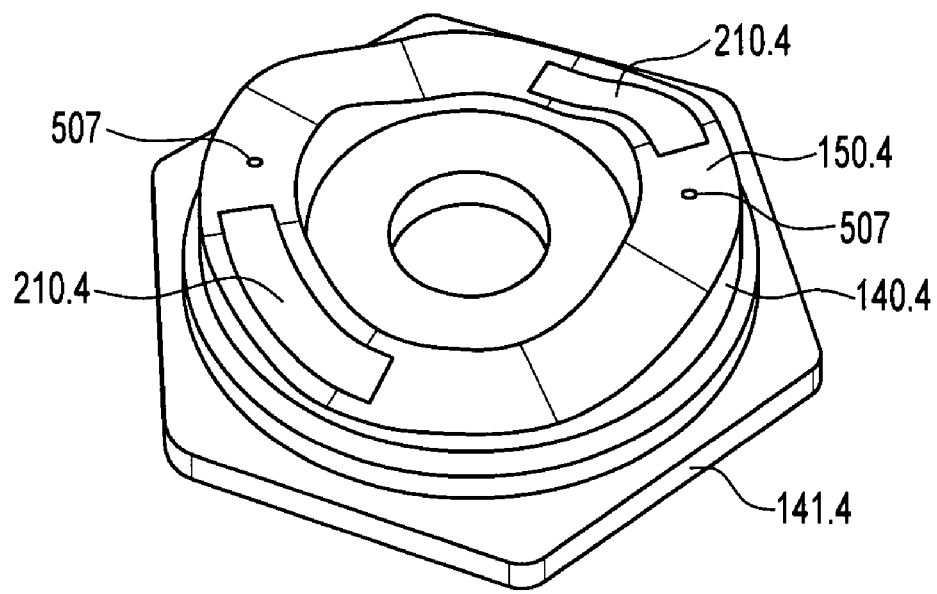
FIG. 19 is a top perspective view showing an undulating cam surface of the rotary device of FIG. 1 when the rotary device is used an expander.
Figure 23:
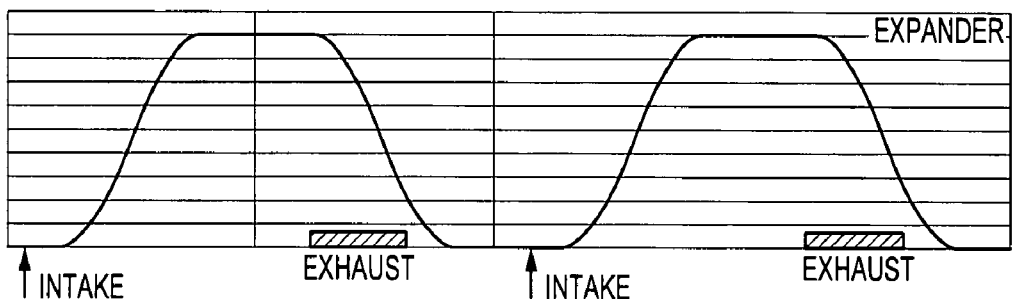
FIG. 23 is a simplified diagrammatic view showing the cycles of the rotary device of FIG. 1 when the rotary device is used as an expander.

FIG. 19 shows a stator 141.4 of the rotary device used when the rotary device is an expander. In FIG. 19 like components have been given like reference numerals, as in FIG. 16, with the additional numerical design "0.4". The stator 141.4 has a cam 140.4 disposed thereon. The cam 140.4 has an undulating cam surface 150.4. The cam 140.4 has a high pressure inlet port 507 and an outlet port 210.4. FIG. 23 is a simplified diagrammatic view showing the cycles of the rotary device when the rotary device is an expander.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof. As is readily, apparent the system and method of the present invention is advantageous in several aspects.

What is claimed is:

1. A rotary device comprising:
   a stator having a cam surface;
   a rotor having a sleeve and a hub, the sleeve rotatably engaging a periphery of the cam surface, and the hub extending to the cam surface;
   a plurality of vanes reciprocatingly mounted on the rotor, the vanes each having a first longitudinal edge which slidingly engages the sleeve, a second longitudinal edge which slidingly engages the hub, and an end edge which slidingly engages the cam surface;
   a plurality of first longitudinal edge seals disposed on the sleeve, the first longitudinal edge seals each sealing at least a portion of the first longitudinal edge of one of the vanes against the sleeve, and the first longitudinal edge seals each extending to the cam surface;
   a plurality of second longitudinal edge seals disposed on the hub, the second longitudinal edge seals each sealing at least a portion of the second longitudinal edge of one of the vanes against the hub, and the second longitudinal edge seals each extending to the cam surface;
   a plurality of end edge seals, the end edge seals each being disposed on a respective end edge of one of the vanes, the end edge seals each sealing the respective end edge of one of the vanes against the cam surface, and the end edge seals each being in sealing engagement with respective ones of the first and second longitudinal edge seals.

2. The rotary device as claimed in claim 1, further including a plurality of sealing channels disposed on the sleeve, the sealing channels each receiving a respective one of the first longitudinal edge seals.

3. The rotary device as claimed in claim 2, further including a plurality of resilient members, the resilient members each being disposed in a respective one of the sealing channels, and the resilient members each biasing one of the first longitudinal edge seals to sealingly engage one of the vanes.

4. The rotary device as claimed in claim 3, wherein the sealing channels each have a T-shaped cross-section defining a pocket and a pair of shoulders disposed therein.

5. The rotary device as claimed in claim 4, wherein the first longitudinal edge seals each includes a pair of wiper seals, each of the wiper seals having a sealing portion and a foot portion, the foot portion of each of the wiper seals being substantially perpendicular to the sealing portion of said each wiper seal, the foot portion of each of the wiper seals being disposed within the pocket of one of the sealing channels, and the sealing portion of each of the wiper seals extending from the one of the sealing channels.

6. The rotary device as claimed in claim 5, wherein the resilient members each bias the foot portion of one of the wiper seals to abut a respective one of the shoulders, and the resilient members each bias the sealing portion of the one of the wiper seals to sealing engage one of the vanes.

7. The rotary device as claimed in claim 1, wherein the first longitudinal edge seals each includes a pair of wiper seals.

8. The rotary device as claimed in claim 7, wherein the first longitudinal edge of each of the vanes is rounded, an apex of the first longitudinal edge of each of the vanes is disposed between one of the pair of the wiper seals.

9. The rotary device as claimed in claim 1, further including a plurality of sealing channels disposed on the hub, the sealing channels each receiving a respective one of the second longitudinal edge seals.

10. The rotary device as claimed in claim 9, further including a plurality of resilient members, the resilient members each being disposed in a respective one of the sealing channels, and the resilient members each biasing one of the second longitudinal edge seals to sealingly engage one of the vanes.

11. The rotary device as claimed in claim 10, wherein the sealing channels each have a T-shaped cross-section defining a pocket and a pair of shoulders disposed therein.

12. The rotary device as claimed in claim 11, wherein each of the second longitudinal edge seals includes a pair of wiper seals, each of the wiper seals having a sealing portion and a foot portion, the foot portion of each of the wiper seals being substantially perpendicular to the sealing portion of each of the wiper seals, the foot portion of each of the wiper seals being disposed within the pocket of one of the sealing channels, and the sealing portion of each of the wiper seals extending from the one of the sealing channels.

13. The rotary device as claimed in claim 12, wherein the resilient members each bias the foot portion of one of the wiper seals to abut a respective one of the shoulders, and the resilient members each bias the sealing portion of the one of the wiper seals to sealing engage one of the vanes.

14. The rotary device as claimed in claim 1, wherein the second longitudinal edge seals each includes a pair of wiper seals.

15. The rotary device as claimed in claim 14, wherein the second longitudinal edge of each of the vanes is rounded, an apex of the second longitudinal edge of each of the vanes being disposed between one of the pair of the wiper seals.

16. The rotary device as claimed in claim 1, further including a sealing channel extending along the end edge of each of the vanes, each the sealing channel receiving a respective one of the end edge seals.

17. The rotary device as claimed in claim 16, further including a resilient member disposed in each of the sealing channels, the resilient member biasing one of the end edge seals to sealingly engage the cam surface.

18. The rotary device as claimed in claim 17, wherein the sealing channels each have a T-shaped cross-section defining a pocket and a pair of shoulders disposed therein.

19. The rotary device as claimed in claim 18, wherein the end edge seals each includes a pair of wiper seals, each of the wiper seals having a sealing portion and a foot portion, the foot portion of the each wiper seal being substantially perpendicular to the sealing portion of the each wiper seal, the foot portion of the each wiper seal being disposed within the pocket of one of the sealing channels, and the sealing portion of the each wiper seal extending from the one of the sealing channels.

20. The rotary device as claimed in claim 19, wherein the resilient members each bias the foot portion of one of the wiper seals to abut a respective one of the shoulders, and the resilient members each bias the sealing portion of the one of the wiper seals to sealing engage the cam surface.

21. The rotary device as claimed in claim 1, wherein the cam surface is an undulating cam surface having a maximum slope of 30 degrees.

22. The rotary device as claimed in claim 1, wherein the rotary device is a rotary device selected from a group of rotary devices including an engine, a pump, a compressor, and an expander.

23. A rotor for a rotary device, the rotor comprising:
a sleeve having a plurality of sealing members disposed on an inner concave surface thereof;
a hub disposed within the sleeve and integral therewith, the hub having a plurality of sealing members disposed on an outer convex surface thereof; and
an annular surface disposed between the sleeve and the hub, the annular surface having a plurality of slots extending therethrough.

* * * * *